July 8, 1969   D. H. MARCUS   3,454,777
MEASUREMENT OF OBJECT DISPLACEMENTS AND VELOCITIES
Filed May 10, 1965

INVENTOR.
DANIEL H. MARCUS
BY
Kenyon & Kenyon
ATTORNEYS

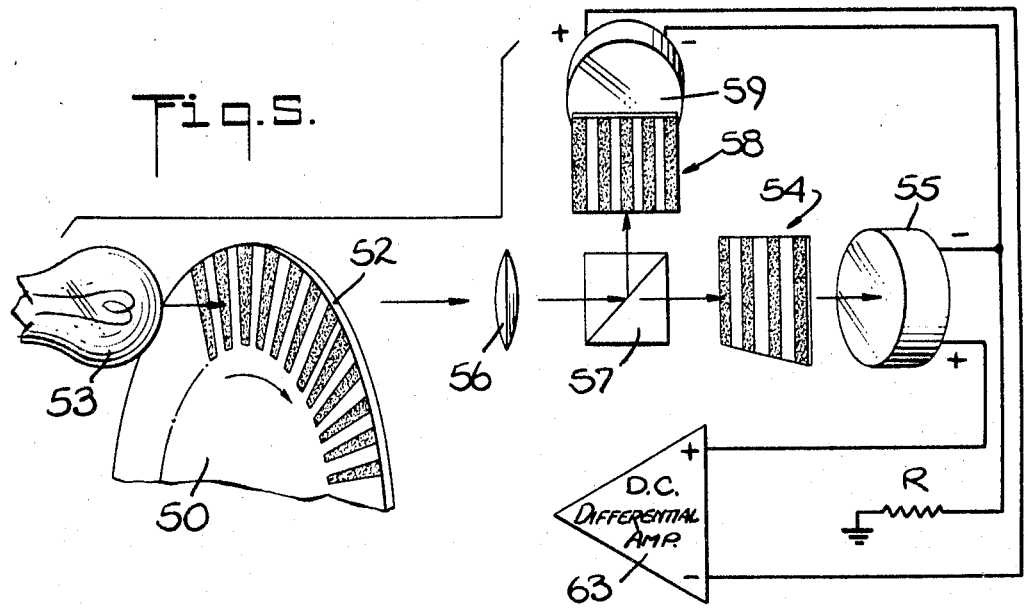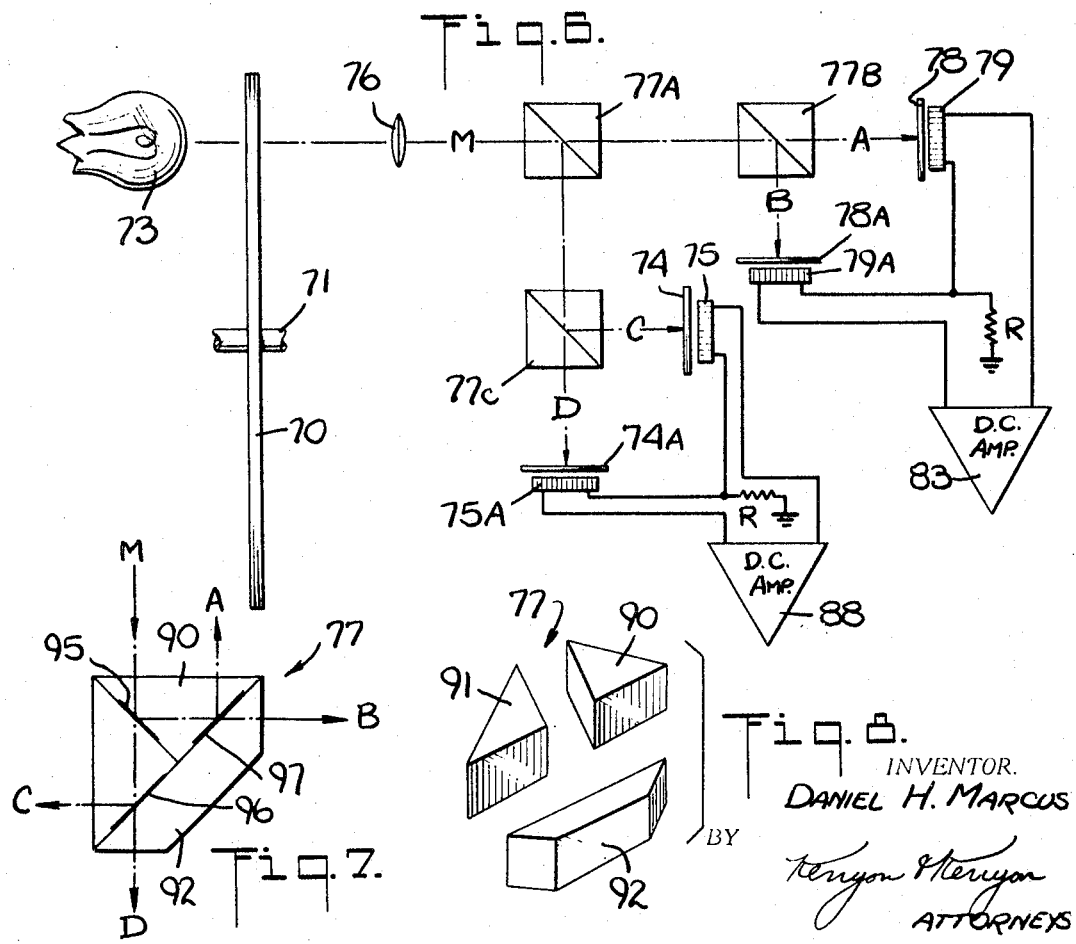

United States Patent Office 3,454,777
Patented July 8, 1969

3,454,777
MEASUREMENT OF OBJECT DISPLACEMENTS AND VELOCITIES
Daniel H. Marcus, Nanuet, N.Y., assignor to Sequential Electronic Systems, Inc., Elmsford, N.Y., a corporation of New York
Continuation-in-part of application Ser. No. 367,455, May 14, 1964. This application May 10, 1965, Ser. No. 456,897
Int. Cl. H01j *39/12*
U.S. Cl. 250—237        9 Claims This application is a continuation-in-part of abandoned application Ser. No. 367,455, filed on May 14, 1964, and entitled "Optical Readout Device."

This invention relates in general to an optical readout system and technique for obtaining a plurality of readout signals having a constant predetermined phase relationship. One particular embodiment of this invention is in an optical readout device for reading shaft angle position (as well as speed) by means of two sinusoidal signals displaced 90° in phase from one another.

This invention is an improvement in optical readout devices, which devices are included as part of equipment frequently termed shaft angle encoders or optical tachometers. Optical readout devices employ a circular track of alternating opaque and clear areas. The track is printed on one face of a glass disc near the periphery of the disc. The disc may then be mounted on a motor shaft so that the track will rotate with the shaft. The clear and opaque areas are generally very narrow. A photocell is placed on one side of the track and a source of light on the other side of the track so that the track will intercept the light being given out by the light source. In addition, a stationary slit or a stationary track (fixed grating) is placed between the light source and the moving track, or between the moving track and the photocell. Thus, as the moving track rotates with the shaft, the amount of light picked up by the photocell varies continuously and the output of the photocell is a sine wave whose phase and frequency gives information concerning the position and rotational speed of the shaft on which the disc containing the track is mounted. For clarity herein, the track on the disc will be referred to alternately as the track or the moving track while the stationary grating will be referred to alternately as the grating or fixed grating.

For many control purposes, it is desirable to obtain two signals from the optical readout device, these signals being 90° out of phase with each other. Accordingly, it is sought to achieve a sine wave and a cosine wave, both of which accurately represent shaft angle position and shaft rotational speed. One important application for such a dual signal from the optical readout device is described in the copending application of Michael Schiller, Ser. No. 353,685, filed on Mar. 23, 1964, and assigned to Sequential Electronic Systems, Inc. Without going into the reasons why certain control system designs require both a sine and a cosine output from the optical readout device, suffice it to say for the purpose of this application that such dual outputs are desired and that such dual outputs are required.

A dual output is obtainable through adaptations of already known optical readout devices. For example, it would be possible to arrange two separate slits through which light would pass to two separate photocells in order to obtain two signals from effectively two separate optical readout devices. By adjusting the position of one of the slits, the output from its associated photocell could be adjusted to be 90° out of phase with the output from the photocell associated with the other slit. The difficulty with such expedients is that they do not attain the accuracy desired and frequently required by control systems which must control the motor to very low speeds and which must also control the motor at zero speed (the latter control requirement meaning that shaft angle position is being controlled). Under virtually any speed condition, adaptations of presently known optical readout devices do not provide sufficiently accurate and constant phase displacement between the two output signals. Disc wobble, waviness in the glass, eccentricity in the mounting of the disc and many other factors, cause variations between the two signals such that a 90° phase difference is not constantly maintained.

Accordingly, it is a major purpose of this invention to devise an optical readout device to provide two output signals having a constant phase relationship to each other.

More specifically, the major purpose of this invention is to obtain such output signals as will maintain their phase relationship at all disc positions (shaft angles).

It is a more specific object of this invention to provide a simple device for obtaining two shaft angle signals in quadrature.

It is another purpose of this invention to obtain such signals under all possible shaft speed conditions, including zero speed.

The optical readout device of this invention has particular importance to low speed and no-speed control circumstances where a high density track is required in order to obtain as high a frequency output as is possible.

The requirement for two signals accurately in quadrature is of great importance to the full and proper operation of the low speed and no-speed control system described in the co-pending Schiller application referenced above. But, the instant invention has useful applications other than for that particular low speed control system. Quadrature outputs have been employed in connection with tachometer discs to increase the signal output frequency. (By generating a pulse each time either the sine wave or the cosine wave crosses the axis in either an ascending or a descending fashion, one can obtain four output pulses for each 360° of disc output and thus quadruple the output frequency.) It should also be noted that quadrature outputs may be used to obtain a high resolution in the output of optical readout devices where a track of low density exists on the disc. Thus the device of this invention may be employed with optical readout devices where the tracks are of low density as well as where they are of high density.

In brief, the optical readout device of this invention involves the employment of a beam splitter between the moving track on the disc and the stationary grating. The beam splitter receives a main beam of light that passes through the moving track and passes approximately 30% of the light directly through the beam splitter as a first subsidiary beam to impinge on a first stationary grating, which first stationary grating is backed up by a first photocell. Another approximately 30% of the light is deflected (generally by 90°) by the beam splitter to form a second subsidiary beam which then impinges on a second stationary grating. The second grating is adjusted in its own plane to so intercept the second subsidiary beam as to produce a signal 90° out of phase with the signal produced by the first subsidiary beam. In this fashion, a single beam through the moving track is used to produce both the sine signal and the cosine signal. (About 40% of the light is absorbed by the coating in the beam splitter.) Accordingly, all variations in phase between the two signals due to disc wobble and surface irregularities are completely obviated because a single beam of light through the disc produces both output signals. Once the beam splitter has been properly placed and the two stationary gratings adjusted to provide outputs exactly in quadrature with one another, that phase relationship will remain constant.

Because the invention will normally be employed in connection with a high density track, a lens will normally be used between the track and the gratings (and thus between the track and the beam splitter) in order to provide sufficient space to insert the beam splitter between the track and the gratings.

Under conditions where the optical readout device is employed to read shaft angle position, the output of the optical readout device will be a D.C. signal. The magnitude of the D.C. output is in part a function of shaft angle and in part a function of the average D.C. level which is developed at all angular positions of the shaft and is the inevitable concomitant of the technique of optical readout discussed herein. This latter component of the D.C. output, referred to herein as the average D.C. component, will change with time primarily as a function of the wearout of the light source or due to minute shifts of the light source filament. Thus the output is not repeatable and it is desirable to have some technique for cancelling this average D.C. level so that the D.C. output level is solely a function of shaft angle position.

A technique, that may be termed common mode rejection, is frequently employed to matrix two output signals properly phased with respect to one another so that the average D.C. level will cancel and the component due to shaft angle position will double in magnitude (electrical noise also tends to cancel). Again, the trouble with prior art techniques is that the two signals differ in matters that lead to error. For example, the light sources to provide the two signals off the track are not identical and thus the two average D.C. levels being subtracted are not identical, or could change differently with time.

Accordingly, it is another object of this invention to provide a technique for accurately and repeatedly measuring shaft angle position by means of an optical readout device.

It is a more particular purpose of this invention to provide a technique for cancelling out the average D.C. level in the output of an optical readout device.

In brief, these latter objectives are achieved by the use of a beam splitter as described above so that two optical signals are developed from one light source and through one track. Two separate gratings are then adjusted to interrogate the two beams generated by the beam splitter at 180° phase difference. Thus, two extremely similar information signals are obtained differing solely by a constant phase. These two signals are then subtracted and the result fed to a D.C. amplifier to give a reading of shaft angle position.

Other objects and purposes of this invention will become apparent from a consideration of the following detailed description and figures, in which:

FIG. 5 is an optical electrical schematic of an embodiment of this invention adapted to eliminate the average D.C. component;

FIG. 6 is an optical and electrical schematic illustrating a device in which the features of FIG. 4 and FIG. 5 are combined to provide two output signals having a quadrature relationship in both of which signals the average D.C. component has been cancelled;

FIG. 7 is a perspective view of the beam splitter employed in the FIG. 6 embodiment; and FIG. 8 is a perspective view of the three prisms that are combined to form the beam splitter of FIG. 7.

Figure 1:
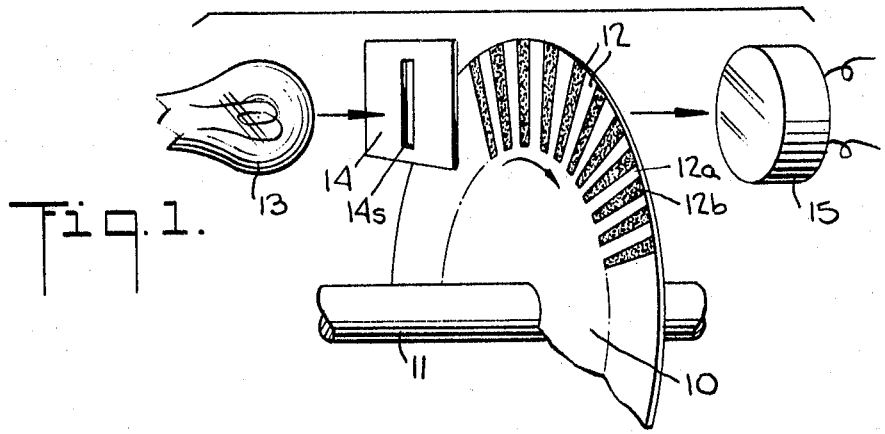
FIG. 1 is an optical schematic of a single prior art device in which a stationary slit and moving track are employed to provide a sinusoidal output having a frequency that is a function of the speed with which the moving track passes by the slit.

With reference to FIG. 1, a glass disc 10 is axially mounted on the shaft 11 whose angular position and angular velocity is to be measured. The shaft 11 thus provides the angular input to this optical readout device. A track 12 having alternate clear areas 12a and opaque areas 12b is printed on one face of the disc 11 near the periphery of the disc 11. A light source 13, a plate 14 having a slit 14s and a photocell 15 are lined up in such a fashion that light from the light source 13 will pass through the slit 14s and the track 12 to impinge on the photocell 15 to provide an output from the photocell. The dimensions of the slit 14s are made to correspond to the dimensions of the opaque 12b and clear 12a areas on the track 12 so that when an opaque area 12b is in line with the slit 14s, a minimum of light will impinge on the photocell 15 and so that when a clear area 12a is in line with the slit 14s, nearly all of the light that passes through the slit 14s will impinge on the photocell 15. As the shaft 11 rotates, the light that reaches the photocell 15 will vary from a maximum (when a clear area 12a is lined up with the slit 14s) to a minimum (when an opaque area 12b is lined up with the slit 14s). The output of the photocell 15 will be a waveform whose frequency will depend upon the rate of rotation of the shaft 11. Within the angular span of an adjacent opaque area 12b and clear area 12a, the phase of the signal output from the photocell 15 will depend upon the angular position of the shaft 11. The shape of the waveform produced may range from a rounded sawtooth to a good sine wave, depending upon the relative placement and spacing of the slit, disc, and photocell. In the ensuing discussion it will be assumed that the components are adjusted to provide sine waves of low harmonic content.

Figure 2:
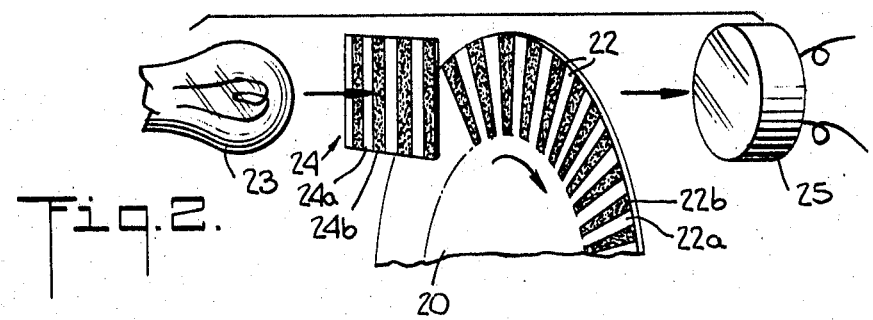
FIG. 2 is an optical schematic of a somewhat more sophisticated prior art device in which a fixed grating and a moving track are interposed between a light source and a photocell so as to obtain a somewhat higher magnitude output then is available from the device of FIG. 1.

The optical readout device of FIG. 2 operates in substantially the same fashion as does FIG. 1. A stationary grating 24 consisting of alternating clear areas 24a and opaque areas 24b, is employed in lieu of the panel 14 having the slit 14s. In this fashion a multiple slit is in effect provided and the magnitude of the light which impinges on the photocell 25 is increased so that the output sinusoidal signal has a greater magnitude than in the FIG. 1 system. As the disc 20 rotates, the moving track 22 passes between the fixed grating 24 and the phtoocell 25 to provide a "picket fence" effect whereby light from the light source 23 is substantially completely blocked from the photocell 25 when the opaque areas 22b are lined up behind the clear areas 24a and whereby a maximum amount of light impinges on the photocell 25 when the clear areas 22a line up behind the clear areas 24a.

In designs where the track 22 (and thus also the grating 24) density is great, the track 22 and grating 24 must be placed very close together in order to maintain an adequate amplitude in the sinusoidal component of the photocell 25 output. The phrase "track density" refers to the number of clear and opaque areas in the track. The track density will increase as greater sensitivity to shaft position and speed is sought. In particular, track density will be increased as the optical readout device is designed to be employed with shafts having low rotational speed. With very high density tracks (where a single opaque area 22b or clear area 22a may be as narrow as .0001 inch) the spacing between the fixed grating 24 and moving track 22 may have to be reduced to as low as 0.002 inch. However, at such small spacings, the frequency and phase of the output are greatly affected by face wobble, eccentricity in the mounting of the disc 20 and other dimensional inaccuracies. In addition, small pieces of dirt may get between the fixed grating 24 and track 22 to distort and damage the equipment and, in some cases, the disc 20 and grating 24 may actually interfere and bind one another as the disc 20 rotates.

Figure 3:
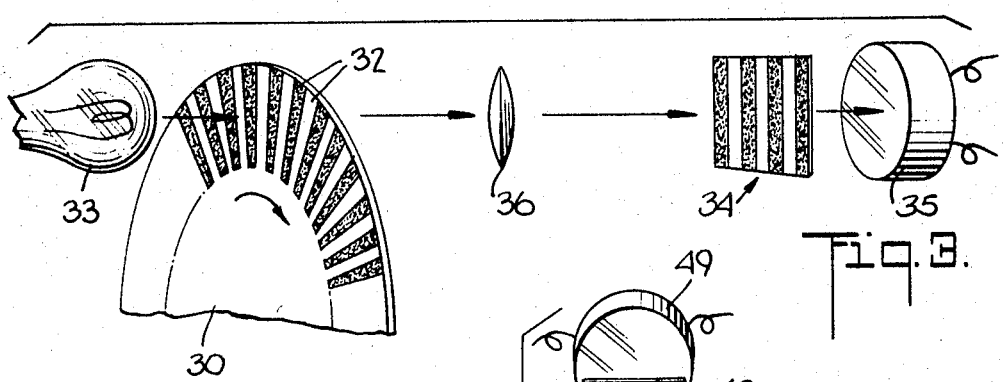
FIG. 3 is an optical schematic illustrating a variation on the device of FIG. 2 wherein a lens is interposed between a moving track and a fixed grating so that the track and grating can be spaced from one another for reasons that will be described herein.

In order to overcome the problems introduced by the close spacing required between the fixed grating and moving track, the system of FIG. 3 may be employed in which a lens 36 is introduced between the disc 30 and gratings 34. The lens 36 serves to project the moving track 32 onto the fixed grating 34. To provide 1:1 magnification, the distance between the center of the lens 36 and each "track" 32 and 34 is twice the focal length of the lens so that, in a typical case, about one-half inch space may exist on each side of the lens 36.

Not only does the employment of the lens 36 permit spacing the disc 30 from the grating 34, but it also reduces the errors due to face wobble and surface waviness of the disc 30 because of the fact that the lens 36 has a depth of field. Because of the depth of field of the lens 36, the position of the object (in this case the track 32) can vary over the distance of this depth of field and will still be focused onto the same surface (which, in this case, is the plane of the fixed grating 34). In order to take advantage of this depth of field, the moving track 32 must be placed between the light source 33 and the lens 36 while the fixed grating 34 and the photocell 35.

In all three of the readout systems thus far described (that is the systems in FIGS. 1, 2 and 3), it is possible to obtain two outputs in quadrature (and thus a cosine signal as well as a sine signal) by establishing a separate grating, a separate light source and a separate photocell in line with a separate portion of the same moving track. The position of the grating can then be adjusted to give an output from the second photocell which has any desired phase relationship to the first photocell. The limitation on this technique for obtaining two signals in quadrature is that eccentricity in the mounting of the disc, face wobble in the disc, inaccuracies in the laying on of the moving track and surface imperfections of the glass cause the phase between the signals from the two photocells to vary during each 360° rotation of the shaft to which the readout device is attached.

Figure 4:
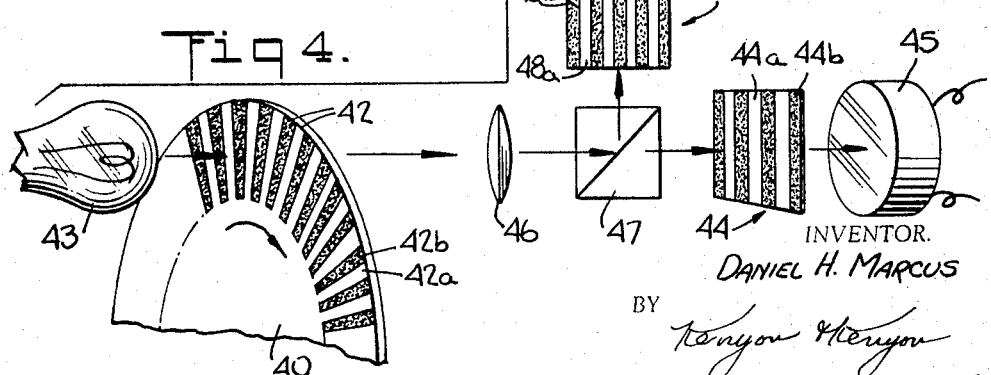
FIG. 4 is an optical schematic of the device of this invention wherein the improvement of this invention is employed in the general schema of FIG. 3 to provide two output signals in quadrature.

FIG. 4 illustrates an optical readout device in which two output signals may be obtained which are always accurately and constantly out of phase with each other by whatever predetermined phase difference is desired. For most applications, the two output signals will be in quadrature. In FIG. 4, a beam splitter 47 is employed to transmit a portion of the light beam that comes through the moving track 42 to a first fixed grating 44, while another portion of the light beam is reflected to a second fixed grating 48. In this fashion, a single beam of light from the light source 43 passes through the clear areas 42a in the moving track 42 to be projected by the lens 46 (through the beam splitter 47) onto the two stationary gratings 44 and 48 to pass through the clear areas 44a and 48a of the gratings 44 and 48 to the photocells 45 and 49.

Thus by use of this beam splitter 47, a single beam of light passing through the moving track 42 is used to generate both the sine signal and the cosine signal. Accordingly, face wobble, glass runout and eccentric disc mounting have no effect whatsoever on the phase relationship between the two output signals. After the gratings 44 and 48 have been adjusted to provide the desired phase relationship between the outputs of the photocells 45 and 49, that desired phase relationship will remain constant regardless of defects in the disc 40 on which the track 42 is printed.

Furthermore, because of the depth of field of the lens 46, the output signal, if initially adjusted to be a clean sine wave, will remain free of distortion which could occur due to face wobble of the disc. Accordingly, the lens 46 serves the dual purpose of allowing space for the beam splitter 47 and maintaining a clean sine wave. However, it is the beam splitter 47 which provides the constant phase relationship that is the main purpose of this invention.

The distance on both sides of the lens 46 is twice the focal length. This distance is selected in order to have the track 42 project without magnification or demagnification on the fixed gratings 44 and 48. It should be noted that because of the material out of which the beam splitter 47 is made, the light path distance on the right hand side of the lens 46 will be dimensionally greater than the distance to the left on the lens 46.

FIG. 5 represents an application of this invention to the development of two intermediate signals which are so phased with respect to one another so that the two intermediate signals can be combined to provide an output signal that has no "average D.C. component." As is true in all the optical readout devices described herein, the light from the light source 53 bends and scatters sufficiently so that there is no position of the rotatable track 52 which will permit the gratings 54 or 58 to completely block out light from either of the photocells 55 or 59. There is simply a position of the track 52 which will develop the maximum signal from any one of the photocells and another position of the track 52 which will develop the minimum signal from that photocell. As the track 52 rotates, the output of each photocell will go through a sinusoidal excursion between that minimum point and that maximum point. However, the sinusoidal excursion will be riding on top of what is called herein an "average D.C. component."

The basic structure of FIG. 5 is the same as that of FIG. 4. The light emitted from the light source 53 passes through the grating that constitutes the moving track 52 to be focused by the lens 56 onto the fixed gratings 54 and 58. A beam splitter 57 provides the two signals required. The interrogating gratings 54 and 58 are adjusted relative to one another in such a fashion that the sinusoidal components of the optical signals incident on the photocells 55 and 59 are 180° out of phase with one another. Thus, when the magnitude of the optical signal impinging on photocell 59 is increasing, the magnitude of the optical signal in photocell 55 is decreasing. The outputs of two photocells 55 and 59 are connected, as shown, with their negative terminals connected through a resistor R to ground and their positive terminals connected to respective ones of the two inputs of a differential amplifier 63. In this fashion the average D.C. in the two signals from the photocells 55, 59 is cancelled at the amplifier 63 and the sinusoidal components are doubled to form a single sinusoidal signal. This sinusoidal signal may then be processed by whatever processing equipment is required for whatever processing is desired.

In FIG. 5, the output of the photocells 55 and 59 are shown as being applied to a D.C. amplifier 63. This is because the particular application for which the arrangement of FIG. 5 has been found to be useful is one where the optical readout device is employed to measure shaft angle position. Thus the moving track 52 might be more accurately termed a movable track 52 since its position does not change while a reading of shaft position is underway. The outputs then of the two photocells 55 and 59 are two D.C. signals whose magnitudes are partly determined by the average D.C. level that is coming through and are further determined by the points on the sinusoidal curve at which the gratings 54 and 58, respectively, are interrogating the optical signal passed by the track 52. Since the gratings 54 and 58 are adjusted to interrogate at a 180° phase displacement condition, the outputs of the two photocells 55 and 59 will normally differ in magnitude. When these two outputs are subtracted from one another, the average D.C. level will cancel. But a D.C. output will be obtained representing twice the D.C.

component in either of the outputs of the two photocells 55 and 59, which D.C. component is due to the point on the sinusoidal curve where the optical signal has been interrogated.

FIG. 6 illustrates an embodiment combining the features of FIGS. 4 and 5. In FIG. 6, a rotatable disc 70 is shown in cross-section mounted on a shaft 71. The disc 70 shall be understood to have a peripheral track like those shown on the discs 40 and 50 in FIGS. 4 and 5. A light source 73 provides a single beam of light that passes through the track of the disc 70 to be received by the projecting lens 76. The beam is then first split by a first beam splitter 77 into two secondary beams, one of which will be interrogated so as to represent a point on the sine function and the second one of which will be interrogated so as to ultimately represent a point on the cosine function. The first secondary beam is then further split into two further beams A and B by a beam splitter 77B while the second secondary beam is split into two further beams C and D by the beam splitter 77C. Beam A is interrogated by the grating 78 while beam C is interrogated by the grating 74. These two gratings 78 and 74 are adjusted so as to interrogate 90° out of phase with one another thereby providing signals which correspond to the sine and cosine functions respectively. Accordingly, the outputs from the photocells 79 and 75 have the same relationship as the optical signals passed by the interrogating gratings 78 and 74. Beam B is interrogated by a grating 78A, which grating is adjusted to interrogate at a point 180° out of phase with the grating 78. Thus the output from the photocell 79A has the same relationship to the output from the photocell 79 as has been discussed in connection with the outputs from the two photocells 55 and 59 in the FIG. 5 embodiment. When these two outputs are subtracted, the average D.C. component is eliminated and the D.C. signal applied to the D.C. amplifier 83 represents the appropriate point of the sine function.

Similarly, the grating 74A is adjusted so as to interrogate the beam D at a position 180° out of phase with the interrogation of the beam C by the grating 74. Thus the sinusoidal portion of the two electrical signals developed at the photocells 75 and 75A are 180° out of phase and the average D.C. component is accordingly eliminated when these two signals are combined in the amplifier. The D.C. signal that is then applied to the D.C. amplifier 88 is a signal that has a magnitude corresponding to the appropriate point on the cosine function.

In the above fashion, FIG. 6 provides two D.C. outputs, one each from the amplifiers 83 and 88. Both of the amplifier 83, 88 outputs represent shaft angle position and have relative magnitudes corresponding to the two points in quadrature on a sinusoidal curve.

Because of the requirement for very short distances between the disc 70 and interrogating grating 78, 78A, 74 and 74A, it becomes important to design a beam splitter which is very compact. The beam splitter 77 illustrated in FIG. 7 provides the requisite compactness for the FIG. 6 embodiment. The structure of the beam splitter 77 of FIG. 7 may be more readily comprehended by the exploded perspective of FIG. 8 which shows the beam splitter 77 as being comprised of two right triangular prisms 90 and 91 together with a dove prism 92. When assembled, the interfaces 95, 96 and 97 are appropriately coated so as to reflect and transmit equal quantities of incident light.

In operation, the main beam of light M from the projecting lens 76 (see FIG. 6) is split at the interface 95 to form two beams of light, a first one of which is further split at the interface 97 to form the light beam A and B while the second one is split at the interface 96 to form the light beams C and D. The light beams A and B may then be interrogated by the gratings 78 and 78A to provide a sine function indication of shaft angle position with common mode rejection of average D.C. Similarly, the light beams C and D may be interrogated by the gratings 74 and 74A to provide a cosine function D.C. signal indicating shaft angle position with common mode rejection of the average D.C. component.

Three embodiments of the invention have been described above representing particularly significant and useful applications for this invention. Although the specific embodiments of the invention have been described in the manner in which they are an improvement over other designs detailed, it will be clear to one skilled in this art that certain variations may be made without departing from the inventive concept.

For example, the invention has been described primarily in connection with a desire to obtain two signals in quadrature. Obviously, either one of the stationary gratings 44 or 48 could be adjusted so that the outputs of the photocells 45 and 49 could have any desired phase relationship.

It is contemplated that the invention will employ the projecting lens 46 in order to provide sufficient space between the moving track 42 and the fixed gratings 44 and 48 to permit inserting the beam splitter 47 (as well as for the other benefits described herein). However, it is conceivable that the distance between track and gratings may be sufficiently great where a low density track is employed (as might be the case where high speed tachometer applications are involved) so that a beam splitter 47 could be designed to be inserted between the moving track 42 and the fixed gratings 44 and 48 without requiring the projecting lens 46.

It should be understood that the illustrations are schematic in order to most clearly represent the manner of operation of this invention. Thus elements unnecessary to the explanation of this invention have been left out of the illustration in order to avoid confusion and to clarify description. For example, a condensing lens would normally be used between the light source 43 or 53 and the track 42 or 52, respectively, so that a more efficient use of light would be obtained. However, this type of feature in optical design is obvious to one skilled in this art and is a known element in these optical readout devices.

In addition, variable resistors will normally be included at one of the terminals of each photocell 55 and 59 in the FIG. 5 embodiment so as to permit compensation for the different operating characteristics that inevitably exist between any two individual photocells. An adjustment of these variable resistors assures that the outputs of the two photocells are completely comparable in magnitude of output current so that the subtraction of the D.C. components of the two signals results in complete cancellation of the unwanted average D.C. output.

The phrase "fixed grating" has been employed to indicate that the grating does not move during operation of this device as contrasted with the track which is mounted on a shaft and rotates with the shaft under most circumstances (of course, at zero speed, neither the track nor the grating rotate). However, it must be recognized that the fixed grating is adjustable so as to obtain the desired phase relationship between the two outputs.

The term "photocell" is used in the specification and claims to refer to the device which is most likely to be used as a transducer to develop an electrical signal from a light signal. However, it should be understood that any photo-electric transducer would be an equivalent of the photocell and the term photocell is used in a generic sense to refer to all photoelectric transducers which may be employed.

A beam splitter has been described and illustrated as the means for obtaining two separate subsidiary light signals from the main light signal since a beam splitter is the preferred technique for obtaining the results. However, it should be understood that a time division switching technique might be used whereby the main light beam is sampled, as by a rotating mirror, to obtain two subsidiary beams for generating two separate output signals. It should be understood that such a technique, though not a preferred instrumentation, is an equivalent of the technique and device disclosed and claimed herein.

It would, of course, also be possible by the use of appropriate lenses and spacing to obtain a further division of the subsidiary beams into additional beams so as to obtain a plurality of output signals greater than two. Such a construction would merely be a reiteration of the basic system of this invention and is to be considered as included in the appended claims.

The term "grating" has been used in the disclosure to contrast with the slit arrangement illustrated in FIG. 1. However, it must be understood that, in general terms, a grating is nothing more than a plurality of slits stacked next to one another so as to form a portion of a complete disc-track. Accordingly, it is to be explicitly understood in the claims that the use of the term grating includes a grating having only one clear space, and thus in effect a slit. A grating is preferred over a slit for the reasons indicated above in that a grating will provide an output signal having a larger magnitude. However, in other respects, the operation of the grating and the slit is substantially the same.

The tracks 42 or 52 shown in the disclosed embodiments are on discs 40 and 50, respectively. A disc track is only one form of track which may be employed. The movable grating or track could be placed on the surface of a rotatable drum with the track lines parallel to the main axis of the drum. A mirror within the drum would be used to deflect light that passes through one edge of the track out the center of the drum in a direction substantially parallel with the main axis of the drum. Indeed, the track could be a linear track; namely one that is a series of parallel opaque and transparent areas parallel to one another on a plane. Such a linear track would be employed in devices adapted to measure linear displacements of objects. Such variations are known in the art and are simply adaptations to the particular displacement parameter being measured. The particular embodiment disclosed was designed to be employed in connection with a shaft angle encoder and in such a case it was convenient to employ a disc that is mounted to the shaft perpendicular to the main axis of the shaft to rotate with the shaft. The deployment of the track can obviously be adapted to the nature of the displacement to be measured.

Furthermore, as discussed above, the basic inventive technique disclosed in FIGURE 4 can be employed to provide an accurate shaft angle position measurement and/or a shaft rotational speed measurement. Accordingly, the following claims to an apparatus for measuring object displacement shall be understood to include those embodiments which provide a velocity measurement.

With the above comments in mind, the operation of the embodiments of this invention can be simply stated in broad terms. A main beam of light is emitted by a light source and modulated by the track. The modulated main light beam is then divided (preferably by a beam splitter) into two subsidiary beams. Both of the subsidiary beams are then interrogated by separate gratings to provide two separate information signals. The position of the gratings may be adjusted to obtain any desired phase relation between the two information signals.

Accordingly, it is intended that the following claims cover the invention in all embodiments and it shall be understood that the claims are commensurate with the true scope of the invention.

What is claimed is:

1. Apparatus for measurement of the displacement of an object comprising:
   means to provide a main light beam,
   a movable track adapted to be coupled to the object for movement therewith, said track being disposed in the path of said main light beam to provide a modulated main light beam,
   beam splitting means disposed in the path of said modulated light beam to provide first and second modulated subsidiary light beams,
   a first fixed interrogating grating disposed in the path of said first modulated subsidiary light beam to provide a first optical information signal, and
   a second fixed interrogating grating disposed in the path of said second modulated subsidiary light beam to provide a second optical information signal.

2. The displacement measurement apparatus of claim 1 further characterized by:
   a first photoelectric transducer disposed in the path of said first optical information signal to provide a first electrical information signal, and
   a second photoelectric transducer disposed in the path of said second optical information signal to provide a second electrical information signal.

3. The displacement measurement apparatus of claim 1 wherein at least one of said fixed gratings is adjustable in a direction transverse to the path of the one of said subsidiary light beams that is interrogated by the said one of said gratings to provide an adjustment in the phase relationship between said first and second optical information signals.

4. The displacement measurement apparatus of claim 3 wherein the position of said fixed gratings is adjusted to provide said second optical information signals 90° out of phase with said first optical information signal.

5. The displacement measurement apparatus of claim 3 wherein the position of said fixed gratings is adjusted to provide said second optical information signals 180° out of phase with said first optical information signal.

6. The displacement measurement apparatus of claim 5 further characterized by: means for subtracting said first and second information signals from one another to provide a resultant information signal having no average D.C. value.

7. The displacement measurement apparatus of claim 1 wherein said movable track is a rotatable disc adapted to be coupled to the shaft of an object whose rotational displacement is to be measured.

8. The method of obtaining two information signals representing object displacement position wherein the two signals maintain a constant predetermined phase relationship to each other through all positions of the object whose position is being measured, comprising the steps of:
   modulating a main light beam with a track that is coupled to move with said object to provide a main modulated light beam that is modulated as a function of the position of the object,
   splitting said main modulated light beam into a first subsidiary light beam and a second subsidiary light beam,
   interrogating said first subsidiary light beam with a first stationary grating to obtain a first information signal,
   interrogating said second subsidiary light beam with a second stationary grating to obtain a second information signal, and
   adjusting the transverse position of said second stationary grating to adjust the phase of said second information signal to obtain said predetermined phase relationship between said information signals.

9. Apparatus for the measurement of the displacement of an object comprising:
   means to provide a main light beam,
   a movable track adapted to be coupled to the object for movement therewith, said track being disposed in the path of said main light beam to provide a modulated main light beam,
   first beam splitting means disposed in the path of said modulated main light beam to provide first and second modulated subsidiary light beams,
   second beam splitting means disposed in the path of said first modulated subsidiary light beam to provide third and fourth modulated subsidiary light beams, third beam splitting means disposed in the path of said second modulated subsidiary light beam to provide fifth and sixth modulated subsidiary light beams, a first fixed interrogating grating disposed in the path of said third modulated subsidiary light beam to provide a first optical information signal, a second fixed interrogating grating disposed in the path of said fourth modulated subsidiary light beam to provide a second optical information signal, a third fixed interrogating grating disposed in the path of said fifth modulated subsidiary light beam to provide a third optical information signal, a fourth fixed interrogating grating disposed in the path of said sixth modulated subsidiary light beam to provide a fourth optical information signal, transducer means for converting said first, second, third and fourth optical information signals into first, second, third and fourth electrical information signals, means for transversely adjusting the positions of said fixed gratings to provide a 180° phase displacement relationship between said first and second optical information signals, a 180° phase relationship displacement between said third and fourth optical information signals, and a 90° phase relationship between said first and third optical information signals, first means for subtracting said first and second information signals from one another to provide a first resultant information signal having no average D.C. value, and second means for subtracting said third and fourth information signals from one another to provide a second resultant information signal having no average D.C. value.

References Cited

UNITED STATES PATENTS 3,014,134  12/1961  Bower.
3,153,111  10/1964  Barber et al. _____ 250—237 X
3,175,093  3/1965  De Lang.

RALPH G. NILSON, *Primary Examiner.*

MARTIN ABRAMSON, *Assistant Examiner.*

U.S. Cl. X.R.
250—219, 231